United States Patent
Ertle et al.

(10) Patent No.: US 9,407,119 B2
(45) Date of Patent: Aug. 2, 2016

(54) HOUSEHOLD DEVICE HAVING AN IMPROVED SHAFT

(75) Inventors: Roland Ertle, Lauingen (DE); Erika Ulrike Ertle, legal representative, Lauingen (DE); Marion Ertle, legal representative, Lauingen (DE); Lisa Marie Ertle, legal representative, Lauingen (DE); Marco Andreas Ertle, legal representative, Lauingen (DE); Bruno Reiter, Kösingen (DE); Franz-Josef Wagner, Nördlingen (DE)

(73) Assignee: BSH Hausgeräte GmbH, Munich (DE)

( * ) Notice: Subject to any disclaimer, the term of this patent is extended or adjusted under 35 U.S.C. 154(b) by 1967 days.

(21) Appl. No.: 12/223,995

(22) PCT Filed: Jan. 15, 2007

(86) PCT No.: PCT/EP2007/050316
§ 371 (c)(1),
(2), (4) Date: Feb. 25, 2010

(87) PCT Pub. No.: WO2007/098976
PCT Pub. Date: Sep. 7, 2007

(65) Prior Publication Data
US 2010/0288316 A1    Nov. 18, 2010

(30) Foreign Application Priority Data
Feb. 24, 2006  (DE) ............... 10 2006 008 762.3

(51) Int. Cl.
*H02K 5/12*   (2006.01)
*A47L 15/42*  (2006.01)
(Continued)

(52) U.S. Cl.
CPC .............. *H02K 5/12* (2013.01); *A47L 15/4225* (2013.01); *D06F 39/085* (2013.01); *F04D 29/043* (2013.01); *H02K 5/128* (2013.01); *H02K 7/003* (2013.01); *F05C 2203/083* (2013.01)

(58) Field of Classification Search
CPC .  F04D 29/043; F04D 13/0606; F04D 13/025; F04D 13/026; F04D 13/0633; H02K 7/003; F05C 2203/083; F05C 2203/0847
USPC ........................... 134/56 D, 57 D, 58 D, 184
See application file for complete search history.

(56) References Cited

U.S. PATENT DOCUMENTS 2,796,835 A * 6/1957 White ......................... 417/357
2,926,071 A * 2/1960 Alexander ..................... 423/81

(Continued)

FOREIGN PATENT DOCUMENTS

DE    1 750 878    5/1971
DE   195 08 085   10/1995
(Continued)

OTHER PUBLICATIONS

International Search Report PCT/EP2007/050316.

*Primary Examiner* — David Cormier
(74) *Attorney, Agent, or Firm* — Michael Tschupp; Andre Pallapies

(57) ABSTRACT

A water-guiding household device, in particular, a dishwasher, equipped with an improved drive shaft which is arranged in the wet running pump. A coating made of a chrome-nitrogen compound is applied to the drive shaft according to a PVD method.

18 Claims, 1 Drawing Sheet

(51) Int. Cl.
  *D06F 39/08* (2006.01)
  *F04D 29/043* (2006.01)
  *H02K 5/128* (2006.01)
  *H02K 7/00* (2006.01)

(56) References Cited

U.S. PATENT DOCUMENTS

| | | | | |
|---|---|---|---|---|
| 3,119,342 | A | * | 1/1964 | White ............................. 417/357 |
| 3,138,106 | A | * | 6/1964 | Lebkuchner ................... 417/357 |
| 3,186,778 | A | | 6/1965 | Torii |
| 3,951,759 | A | | 4/1976 | Studer |
| 4,404,483 | A | * | 9/1983 | Lebkuchner ..................... 310/86 |
| 4,728,579 | A | * | 3/1988 | Konig ............................. 428/472 |
| 5,582,414 | A | * | 12/1996 | Miyazaki et al. .............. 277/444 |
| 5,692,886 | A | * | 12/1997 | Kobayashi .......... F04D 13/0646 415/111 |
| 5,700,094 | A | * | 12/1997 | Dam et al. ..................... 384/569 |
| 6,271,612 | B1 | | 8/2001 | Tanaka et al. |
| 6,997,688 | B1 | * | 2/2006 | Klein et al. .................... 417/420 |
| 2002/0154840 | A1 | | 10/2002 | Sugiyama et al. |
| 2005/0214135 | A1 | * | 9/2005 | Shibuya et al. ................ 417/357 |

FOREIGN PATENT DOCUMENTS

| | | |
|---|---|---|
| JP | 6-341438 | 12/1994 |
| JP | 11-125243 | 5/1999 |

* cited by examiner

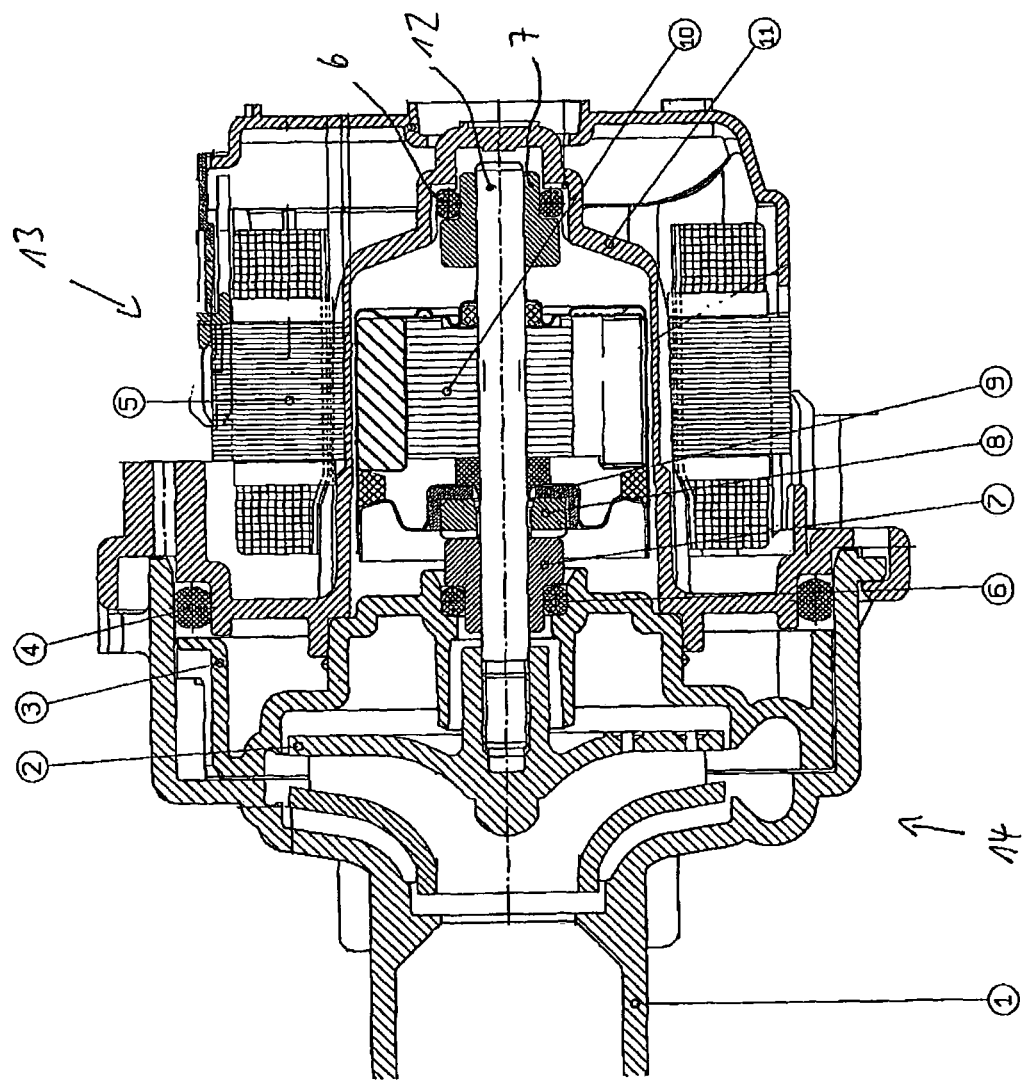

HOUSEHOLD DEVICE HAVING AN IMPROVED SHAFT

BACKGROUND OF THE INVENTION

The invention relates to a domestic appliance, in particular a water-carrying domestic appliance, e.g. a dishwasher, containing a moving object to be carried by a plain bearing, with a coating being disposed on the moving object.

In water-carrying domestic appliances, e.g. in dishwashers or washing machines, "wet-running pumps" are used. The shaft bearing is designed as a radial plain bearing, which the relevant washing liquid, essentially water, flows over in wet-running pumps. The washing liquid, as the medium to be pumped by the pump, often contains corrosive substances, e.g. chloride from domestic or drinking water or produced by the water softener of the dishwasher. Hence stainless steel shafts are often used to avoid corrosion on the shaft. The washing liquid frequently contains particulates such as sand, silicates or metals, some of which are abrasive components originating from particulates removed e.g. from the bearing or the shaft. Stainless steel shafts, however, have a low surface hardness, so that when corresponding particulates exist in suspension in the liquid this results in roughening of the surface of the stainless steel shaft and hence to premature failure of the radial bearing owing to increased friction.

When hardened steels are used, failure generally occurs from corrosion because hardened steel is a carbon alloy. Even applying a hard-metal coating such as chrome by electroplating, for example, results in failure of the radial bearing because of flaking. Shafts made of oxide-ceramic materials are more expensive to manufacture and are only of limited use because the properties of oxide-ceramic materials make them difficult to shape and machine. In addition, shafts made of oxide-ceramic materials cannot withstand dry running in radial bearings.

Hence the object of the present invention is to provide a domestic appliance having a low-cost drive shaft that is also capable of working with liquids containing corrosive substances and particulates in a wet bearing and has good dry-running properties.

It is also the object of the invention to provide a suitable coating method.

This object is achieved by a domestic appliance according to the invention as claimed in claim 1 and by a coating method according to the invention as claimed in claim 20. Advantageous embodiments are the subject of the dependent claims.

In a domestic appliance according to the invention, e.g. hairdryer, mixer or vacuum cleaner, in particular a water-carrying domestic appliance, e.g. dishwasher or washing machine, containing a moving object to be carried by a plain bearing, with a coating, in particular containing a metallic element, being disposed on the moving object, the coating contains at least one non-metallic element having a mole fraction of at least 1%, where the hardness of the coating equals at least 800 HV, in particular at least 2000 HV.

In particular, the coating contains at least one metallic element. The mole fraction of the non-metallic element or of the non-metallic elements, e.g. nitrogen, is greater than 3%, for example, in particular greater than 25%. Materials used for coatings often contain traces, i.e. very small proportions, e.g. in the region of less than 0.5% mole fraction, of elements, e.g. oxygen or carbon. In particular the coating is made of ceramic or ceramic-like materials. The coating is preferably made of a chemical compound containing at least one non-metallic element and at least one metallic element.

The at least one non-metallic element is preferably, for example, an element from the halogen group, from the oxygen group or from the nitrogen group or carbon. Non-metallic elements are taken also to include noble gases.

In particular, the coating contains at least one metallic element having a mole fraction of at least 1%.

The metallic elements are preferably, for example, elements from the group of alkali metals, alkaline earth metals or earth metals or, for example, lead or tin.

The coating material is preferably a chemical compound made of at least one metallic element and at least one non-metallic element.

The coating is preferably applied by physical deposition from the gas phase (PVD technique) e.g. by vapor deposition, sputtering, the plasma vacuum technique or ion implantation.

In a further embodiment, the coating is applied by deposition from the vapor phase, e.g. thermal CVD, plasma CVD, photon CVD or laser-induced CVD.

In an additional embodiment, the coating is applied by chemical coating techniques e.g. electroplating.

The coating preferably contains chrome and/or nitrogen and, in particular, is made of a chrome-nitrogen compound. The metallic element is hence chrome and the non-metallic element nitrogen. Other chemical elements can also be used apart from these elements. For instance, the coating may be made of titanium nitride, although owing to the higher degree of hardness compared with a chrome-nitrogen compound this tends to flake off and is hence less suitable.

The thickness of the coating preferably lies between 0.1 μm and 20 μm, in particular in the region of 5 μm.

In a preferred embodiment, the moving object is a shaft that is carried by a radial bearing.

In a preferred embodiment, the shaft can be driven by an electric motor.

In a further embodiment, an impeller or a propeller of a pump can be driven by the shaft.

BRIEF SUMMARY OF THE INVENTION

The radial bearing of the shaft is preferably implemented as a wet bearing.

In a further embodiment, the radial bearing is made of sintered carbon and is preferably implemented as a separate bearing bush. Apart from sintered carbon, plastic, for example thermoplastic, can also be used for the radial bearing for instance.

In an additional embodiment, the electric motor and/or the wet-running pump and/or the bearing bush are arranged in a plastic enclosure.

The enclosure is preferably made of several parts.

In a further embodiment, the shaft is made of stainless steel, so that the shaft is non-corrosive.

In a coating method according to the invention for a shaft of a domestic appliance, the coating is applied by a PVD technique, a chemical coating technique or a CVD technique.

In particular, the coating is made of a chrome-nitrogen compound.

The invention is explained below by way of example with reference to a drawing, in which:

BRIEF DESCRIPTION OF THE DRAWING

FIG. 1 shows a cross-section through a wet-running pump together with an electric motor for a dishwasher.

DETAILED DESCRIPTION OF THE PRESENT INVENTION

A wet-running pump 14 is arranged in a dishwasher according to the invention (not shown). An electric motor 13 drives the impeller 2 of the wet-running pump 14 via a shaft 12. The impeller 2 is enclosed by an outer pump housing 1 and an inner pump housing 3. A ring 4 is arranged between the outer pump housing 1 and the motor housing 11. A rotor 10 is driven by a stator 5. The rotor 10 is fixed to the shaft 12. The shaft 12 is carried by a radial bearing as a bearing bush 7. The bearing bush 7 is preferably made of sintered carbon. The bearing bush 7 is connected via a ring 6 to the inner pump housing 3 or to the motor housing 11. In addition, the shaft 12 is enclosed by a ceramic ring 8, with the ceramic ring 8 being carried by a rubber bearing.

The washing liquid in the dishwasher according to the invention flows over the shaft 12 and also over the rotor 10. Hence washing liquid also appears in the gap between the shaft 12 and the bearing bush 7.

The shaft 12 is made of stainless steel and is coated in a material that contains a non-metallic element, e.g. nitrogen. The hardness of the coating is greater than 1000 HV (Vickers hardness), in particular greater than 1500 or 2000 HV. The coating is preferably made of a chrome-nitrogen compound. The coating made of the chrome-nitrogen compound is applied by physical deposition from the gas phase (PVD). This technique, for example, involves vapor deposition, sputtering, a plasma vacuum process or ion implantation. In the plasma vacuum process, the stainless steel shaft 12 is brought into a suitable treatment chamber, and the chrome-nitrogen coating is applied to the stainless steel shaft 12 by burning out chrome ions from a chrome plate using an electric arc, and from nitrogen ions present in the treatment chamber. Other coating techniques such as chemical deposition using an electroplating method result in a coating with unsuitable properties.

The thickness of the coating lies in the range 2 to 10 μm, in particular in the region of 5 μm. The high degree of hardness of the coating (not shown) on the shaft 12 means that particulates present in the washing liquid (suspension) cannot penetrate the surface of the shaft 12 or cause roughening of the surface of the shaft 12. This increases the service life of the wet-running pump 14, in other words the reliability, because there is no increase in friction between the surface of the shaft 12 and the bearing bushes 7 as radial bearings. Using the material stainless steel for the shaft 12 also guarantees corrosion resistance for a washing liquid containing corrosive substances, e.g. chlorine or detergent. The bearing bush 7 is preferably made of sintered carbon or plastic. The coating of the shaft 12 also guarantees the required dry-running reliability, i.e. running when there is no cleaning liquid or water around the bearing bushes 7. Radial bearings need to be able to tolerate dry running in many applications of wet-running pumps, e.g. in dishwashers in critical operating conditions such as frothing, bubble-forming or improper use. Using a PVD technique to apply the coating does not impair the original shape of the shaft 12, and because of the coating provides a permanent protective coating even for difficult contours.

To summarize, a wet-running pump is provided in a dishwasher according to the invention whose drive shaft is both significantly cheaper compared with the prior art and, as this shaft has the special coating, is significantly more resistant to mechanical action from particulates and to chemical action from corrosive substances. The reliability and service life of wet-running pumps in dishwashers according to the invention can thereby be increased significantly at lower manufacturing costs.

The invention claimed is:

1. A water-carrying domestic appliance that circulates a washing liquid in a pump housing, the water-carrying domestic appliance comprising a plain bearing, a moving object being carried by the plain bearing and disposed in the pump housing through which the washing liquid is circulated, and an impeller coupled with the moving object, wherein the pump housing includes an outer pump housing defining an outermost portion of the pump housing and an inner pump housing being interior to the outer pump housing, wherein the impeller is enclosed and sandwiched between the outer pump housing and the inner pump housing such that the outer pump housing encloses the impeller from one side of the impeller and the inner pump housing encloses the impeller from an opposite side of the impeller, wherein the impeller is at least partially radially enclosed within side walls of the inner pump housing, and wherein the moving object extends through the inner pump housing, the domestic appliance further comprising a coating disposed on the moving object, wherein the coating is configured to prevent particulates in the washing liquid from penetrating a surface of the moving object and contains at least one non-metallic element having a mole fraction of at least 1%, and wherein the hardness of the coating equals at least about 800 HV, wherein the moving object is a shaft carried by a radial bearing and driven by an electric motor, and wherein the electric motor is disposed in a plastic enclosure separate from the outer pump housing and the inner pump housing, the water-carrying domestic appliance further comprising a first sealing member disposed between the outer pump housing and the plastic enclosure, and a second sealing member disposed between the inner pump housing and the radial bearing, wherein the first sealing member is in radial alignment with the second sealing member.

2. The domestic appliance according to claim 1 wherein the hardness of the coating equals at least 2000 HV.

3. The domestic appliance according to claim 1 wherein the at least one non-metallic element is an element chosen from the group consisting of the halogen group, the oxygen group and the nitrogen group.

4. The domestic appliance according to claim 1 wherein the coating contains at least one metallic element having a mole fraction of at least 1%.

5. The domestic appliance according to claim 4 wherein the at least one metallic element is an element chosen from the group consisting of alkali metals, alkaline earth metals and lead or tin.

6. The domestic appliance according to claim 4 wherein the coating is a chemical compound including at least one metallic element and at least one non-metallic element.

7. The domestic appliance according to claim 1 wherein the coating is applied by physical deposition from the gas phase by a method chosen from the group consisting of vapor deposition, sputtering, a plasma vacuum technique and ion implantation.

8. The domestic appliance according to claim 1 wherein the coating is applied by deposition from the vapor phase including at least one of thermal CVD, plasma CVD, photon CVD and laser-induced CVD.

9. The domestic appliance according to claim 1 wherein the coating is applied by chemical coating techniques including electroplating.

10. The domestic appliance according to claim 1 wherein the coating contains at least one of chrome and nitrogen.

11. The domestic appliance according to claim 1 wherein the thickness of the coating is between about 0.1 μm and about 20 μm.

12. The domestic appliance according to claim 1 wherein the radial bearing of the shaft is formed as a wet bearing.

13. The domestic appliance according to 1 wherein the radial bearing is formed from sintered carbon and is implemented as a separate bearing bush.

14. The domestic appliance according to claim 1 wherein the enclosure is formed from a plurality of parts.

15. The domestic appliance according to claim 1 wherein the shaft is formed from stainless steel.

16. The domestic appliance according to claim 1, wherein the coating is made of a chrome-nitrogen compound.

17. The domestic appliance according to claim 1 wherein the thickness of the coating is about 5 μm.

18. A wet-running pump for a water-carrying domestic appliance, the wet-running pump comprising:
 a pump housing in which a washing liquid is circulated, the pump housing including an outer pump housing defining an outermost portion of the pump housing and an inner pump housing being interior to the outer pump housing;
 an electric motor disposed in a motor housing separate from the pump housing and including a stator and a rotor;
 a plain bearing and a moving object being carried by the plain bearing disposed in the pump housing, wherein the rotor is fixed to the moving object;
 an impeller coupled with the moving object, wherein the impeller is enclosed between the outer pump housing and the inner pump housing and is at least partially radially enclosed within side walls of the inner pump housing, and wherein the moving object extends through the inner pump housing;
 a first sealing member disposed between the outer pump housing and the motor housing;
 a second sealing member disposed between the inner pump housing and the plain bearing, wherein the first sealing member is in radial alignment with the second sealing member; and
 a coating disposed on the moving object, wherein the coating is configured to prevent particulates in the washing liquid from penetrating a surface of the moving object and contains at least one non-metallic element having a mole fraction of at least 1%, and wherein the hardness of the coating equals at least about 800 HV.

\* \* \* \* \*